US005579663A

United States Patent [19]
Likich et al.

[11] Patent Number: 5,579,663
[45] Date of Patent: Dec. 3, 1996

[54] CLUTCH CABLE NOISE AND VIBRATION ISOLATOR

[75] Inventors: Mark D. Likich, Birmingham; Robert P. Uhlig, Rochester Hills, both of Mich.

[73] Assignee: Chrysler Corporation, Auburn Hills, Mich.

[21] Appl. No.: 446,173

[22] Filed: May 19, 1995

[51] Int. Cl.$^6$ .............................. F16C 1/26; F16D 13/58
[52] U.S. Cl. ........................................ 74/502.5; 192/30 V
[58] Field of Search ............................... 192/30 V, 99 S; 74/502.4, 502.6, 502.5; 248/56

[56] References Cited

U.S. PATENT DOCUMENTS

| | | |
|---|---|---|
| 2,954,248 | 9/1960 | Brickman .................. 248/56 X |
| 3,101,205 | 8/1963 | Benham . |
| 3,221,572 | 12/1965 | Swick ....................... 248/56 X |
| 3,285,551 | 11/1966 | Tschanz ....................... 248/56 |
| 3,705,445 | 12/1972 | Smollinger . |
| 4,266,439 | 5/1981 | Hayashi et al. ............ 192/30 V X |
| 4,281,753 | 8/1981 | Takemoto et al. ......... 192/30 V X |
| 4,334,438 | 6/1982 | Mochida . |
| 4,463,843 | 8/1984 | Taig . |
| 4,884,467 | 12/1989 | Martell . |
| 5,299,669 | 4/1994 | Pepping et al. . |

*Primary Examiner*—Rodney H. Bonck
*Attorney, Agent, or Firm*—Thomas G. Pasternak

[57] ABSTRACT

A cable noise and vibration isolator arrangement for use with an actuator cable assembly having a cable core extending through an outer sheath passageway adapted to interconnect an input actuator with an actuated mechanism. A reactive housing of the arrangement includes an aft larger diameter annular portion and a forwardly extending smaller diameter tubular portion having an axial through-bore terminating in the annular portion with an internal truncated conical surface. A rubber isolator includes a large diameter aft end portion interconnected to a forwardly extending barrel portion by an intermediate body portion formed with an outer truncated conical surface and an inner truncated conical socket. The isolator socket is of sufficient size to receive the truncated conical head portion of the sheath in a conforming self-centered manner. The reactive housing tubular portion is sized to telescopically receive the isolator barrel portion therethrough while the housing truncated internal conical surface surrounds the isolator external truncated conical surface. The isolator, by virtue of being sandwiched between the reactive housing internal conical surface and the sheath exterior conical surface, is subjected to both compression and shear cable core loads thereby providing improved vibration and noise damping of energy received by the cable assembly from the mechanism.

5 Claims, 2 Drawing Sheets

5,579,663

CLUTCH CABLE NOISE AND VIBRATION ISOLATOR

BACKGROUND OF THE INVENTION

This invention relates generally to automotive actuator cables and more particularly to a noise and vibration isolator assembly for a vehicle actuator cable.

Automotive transmission noise and engine vibration are typically transmitted into the passenger compartment by actuator cable assemblies. For example, a vehicle clutch cable assembly having an external sheath surrounding a cable core which extends from a clutch pedal to a clutch actuator fork of a transaxle. Such transaxle noise and vibration, which is especially noticeable during manual transmission shifts, creates an annoyance which is audible and vibrationally felt by the vehicle occupants. Common practice is to use an elastomeric washer in compression to isolate the cable core from the actuator fork, where a hard plastic insert locates the cable sheath in the transaxle bellhousing. Elastomeric washers have performed relatively well in the past when the cable core is unloaded. As soon as the clutch is depressed, however, the cable core side loads the sheath along the length of the core, effectively defeating its isolation and transmitting a higher noise and vibration level. It is clear from the above that an improved isolator design requires isolation of the cable sheath. Known solutions involve expensive designs, such as a cylinder within a rubber cylinder, which places the rubber cylinder solely in either compression or tension.

With reference to prior art FIG. 1, a transaxle, generally indicated by 10', includes a cable actuator assembly 13' having a sheath 14' surrounding a cable core 16' in a spaced manner. The cable core 16' extends from a clutch pedal (not shown) through a series of stepped-end portions of the sheath 14'. The stepped-end portions comprise a series of cylinders 22' and 24' progressively increasing in diameter with the front end cylindrical portion 24' shown in abutment with an annular seating boss 26'. The boss 26' is formed on the aft surface of wall portion 28' of a transaxle bellhousing shown at 30' in FIG. 1. The bellhousing 30' is formed with a longitudinal slot 32' through which the cable core 16' extends. The forward end of the core 16' is secured to an upstanding clutch fork 34' having a wall portion provided with a vertical slit 35' for receiving the cable core 16' therethrough A rubber bushing disc 36', sandwiched between a pair of metal washers 37', has a central bore through which the cable core 16' extends. The cable core 16' terminates in a metal ball-shaped ferrule 38' crimped on its forward end. Prior art FIG. 2 shows an elastomeric washer 40' adapted to be compressed between the boss 26' and forward wall 42' of the cable sheath stepped end 24'.

SUMMARY OF THE INVENTION

It is a feature of the present invention to provide a vibration and noise isolator arrangement, adapted for use with various types of cable actuators, which includes a truncated conical isolator sandwiched between an inner truncated conical sheath and an outer truncated conical reactive housing.

It is another feature of the present invention to provide a vibration and noise isolator arrangement which places the isolator in both compression and shear whereby improved isolation characteristics are attained over a range of loading, i.e. a constant spring rate providing a near linear load deflection curve and thereby linear isolation performance.

It a further feature of the present invention to provide a vibration and noise isolator arrangement for cable actuators enabling cable sheath self-centering and self-aligning while transmitting less vibration and noise.

It is another feature of the invention to provide a superior isolating vibration and noise system operative under a wide range of operating loads wherein the isolation system can be applied to both/either the cable core and/or the cable sheath.

It is still another feature of the invention to provide a cable noise and vibration isolator system with improved isolation with minimized total deflection which requires no post-bonding or other special means of assuring desired isolator load transmission.

It is still another feature of the present invention to provide a cable isolator system which is radially and axially compact for a given isolation performance.

These and other features and advantages of the invention will be more fully understood from the following detailed description of the invention taken together with the accompanying drawings.

DETAILED DESCRIPTION OF THE INVENTION

Figure 3:
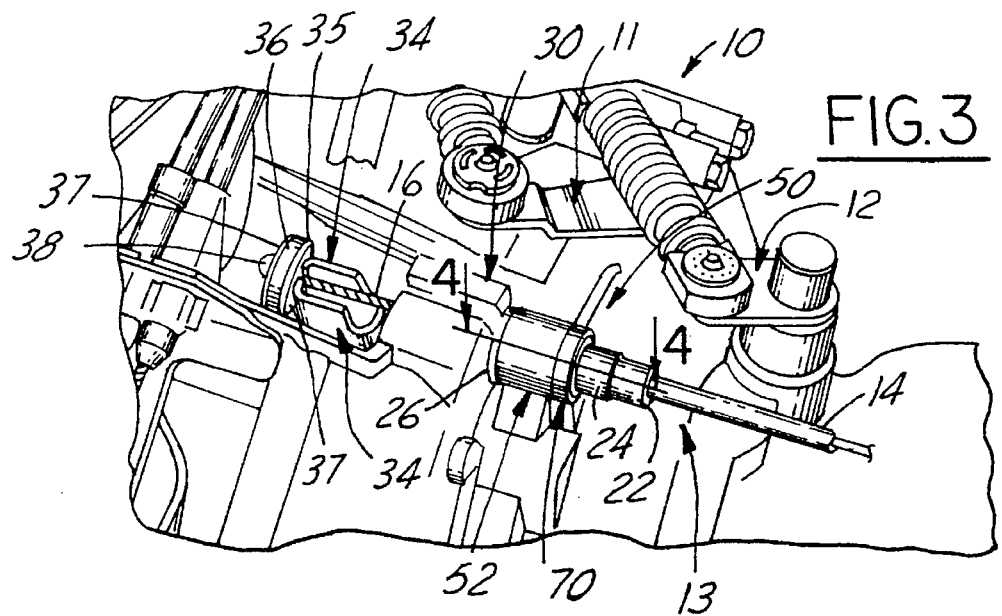
FIG. 3 is a fragmentary perspective view similar to FIG. 1 showing the improved clutch cable noise and vibration isolator of the present invention.
Figure 4:
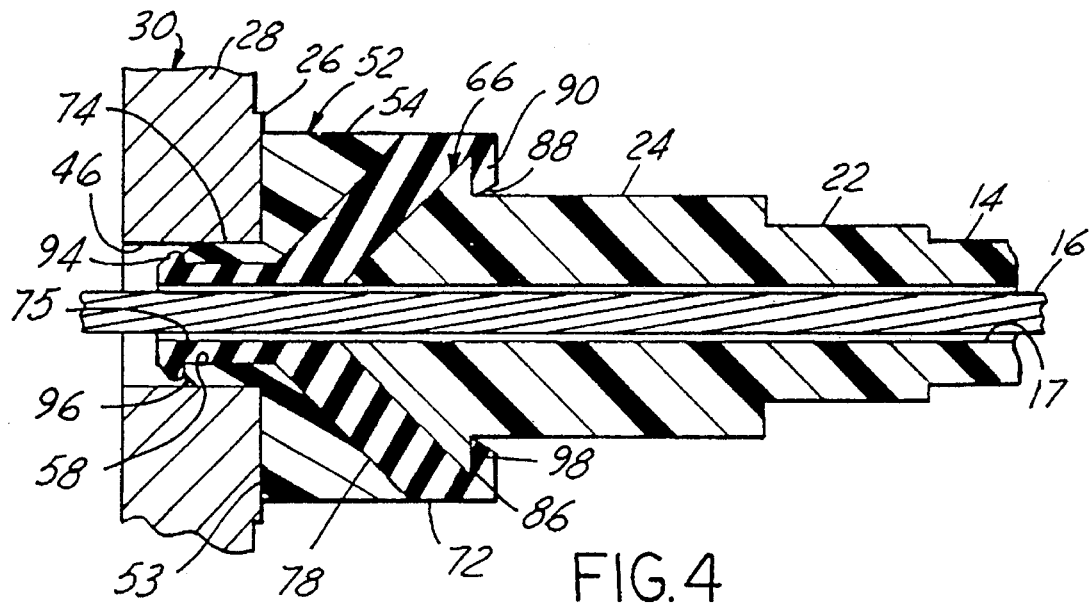
FIG. 4 is an enlarged fragmentary vertical sectional view taken on the line 4—4 of FIG. 3 showing the isolator assembly of the present invention.
Figure 5:
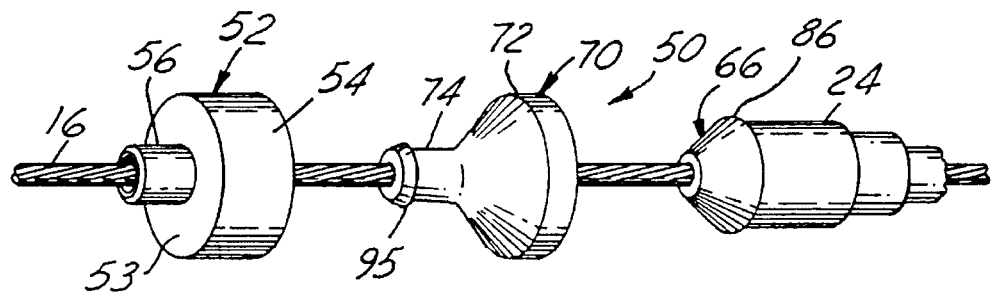
FIG. 5 is a fragmentary perspective view of the structure of FIG. 4 shown in exploded axially spaced relation.

Referring now to the drawings, in FIG. 3 there is shown a conventional motor vehicle manual transaxle 10 including a manual shift control lever 11 and a manual shift cross-over lever 12. A cable actuator assembly, generally indicated at 13, includes a cable sheath 14 of suitable material such as, for example, hard rubber material. With reference to FIG. 4, a cable core 16, which in the disclosed form is a stranded rope-like assembly of wire, is shown surrounded in a spaced manner by a sheath passageway 17. One end of the core 16 is connected to a mechanism actuator or controller such as, for example, a vehicle clutch pedal or the like (not shown). The cable sheath forward end is formed with a series of cylindrical-shaped stepped portions shown at 22 and 24.

As seen in FIG. 3, the large diameter sheath portion 24 is received in an isolator assembly, generally indicated at 50. With reference to FIG. 4, the isolator assembly 50 includes a reactive housing 52 having a forward surface 53 abutting a raised seating boss 26 formed on the aft surface wall portion 28 of transaxle bellhousing 30. FIG. 3 shows the bellhousing 30 formed with a longitudinal slot 32 through which the clutch cable core 16 extends. The forward end of the cable core 16 is secured to an upstanding clutch fork 34 having a wall portion provided with a vertically extending slit 35 receiving the cable core 16 therethrough. A rubber bushing disc 36, sandwiched between a pair of metal washers 37, has a central bore through which the cable core 16 extends. The core 16 extends through bellhousing bore 46 (FIG. 4) and terminates in a metal ball-shaped ferrule retainer 38 secured to the core's forward end.

Upon the clutch pedal being depressed during shifting, the cable core 16 exerts a tension load on the upper end of clutch fork 34. The tension load, together with the cable assembly force, is transmitted through the cable assembly 13 causing the housing forward surface 53 (FIG. 4) to be compressed against the bellhousing seating boss 26. Thus, if the vibrational force on the cable sheath is not attenuated within the cable assembly, it will transmit engine and transaxle vibration and noise into the passenger compartment via the clutch cable core 16, especially during manual shifting.

Figure 1:
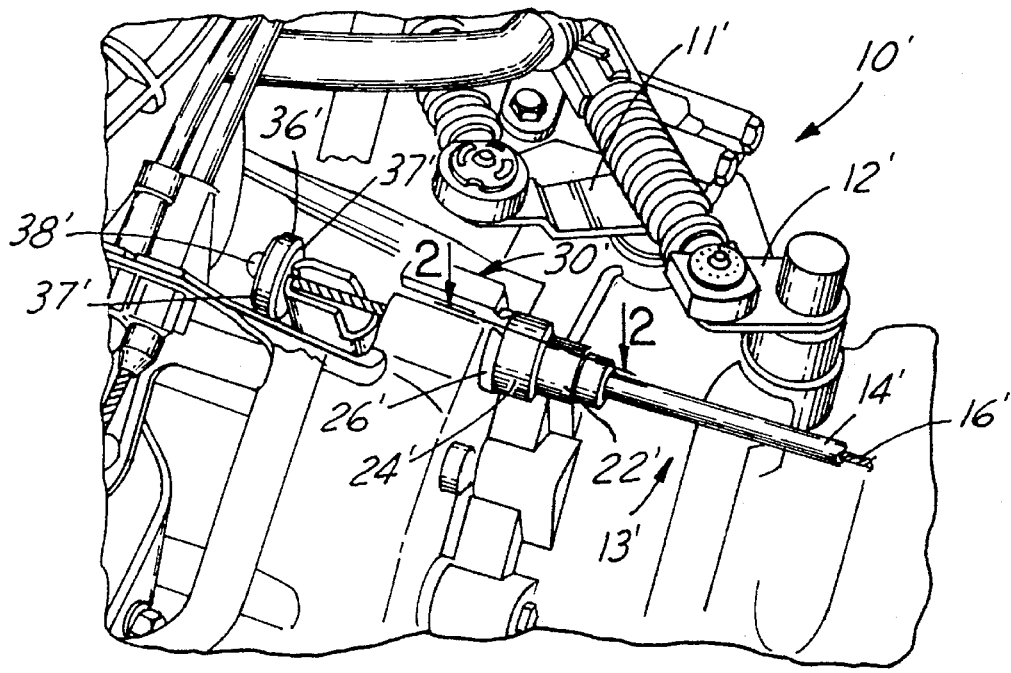
FIG. 1 is a fragmentary perspective view of a transaxle housing and aft bellhousing showing a prior art actuator cable connected to an upper end of a clutch fork by a prior art arrangement.
Figure 2:
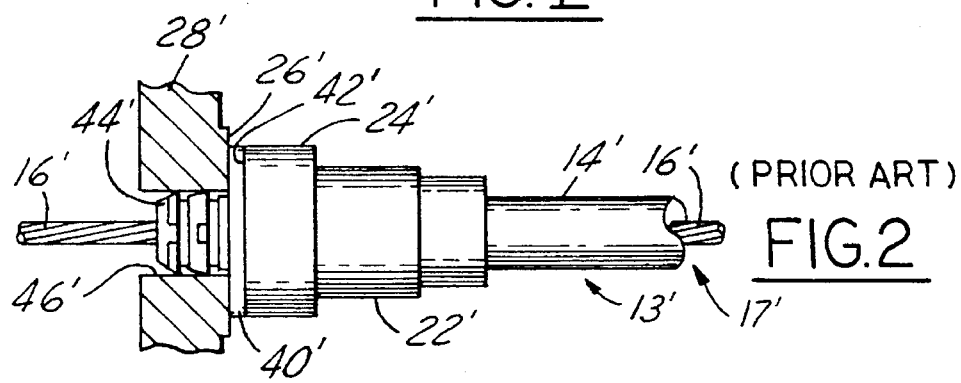
FIG. 2 is a fragmentary enlarged top view of the FIG. 1 clutch actuator cable forward end showing a bellhousing wall boss engaging a prior art elastomeric isolator washer.

It will be noted that the elastomeric isolator washer, shown at 40' in prior art FIG. 2, is intended to isolate the cable core 16' from the bellhousing and clutch isolator fork 34' (FIG. 1). The isolator washer 40' functions reasonably well when the cable core 16' is unloaded. Upon the clutch pedal being depressed, however, the cable core 16' "sideloads" the sheath 14' along the entire length of its passageway 17', defeating the isolation washer 40' and increasing the noise and vibration level. It has been found essential, therefore, to isolate the cable sheath 14' as well as the cable core 16' if improved isolation of noise and vibration of the cable assembly under a wide range of operating loads is to be achieved.

Figure 6:
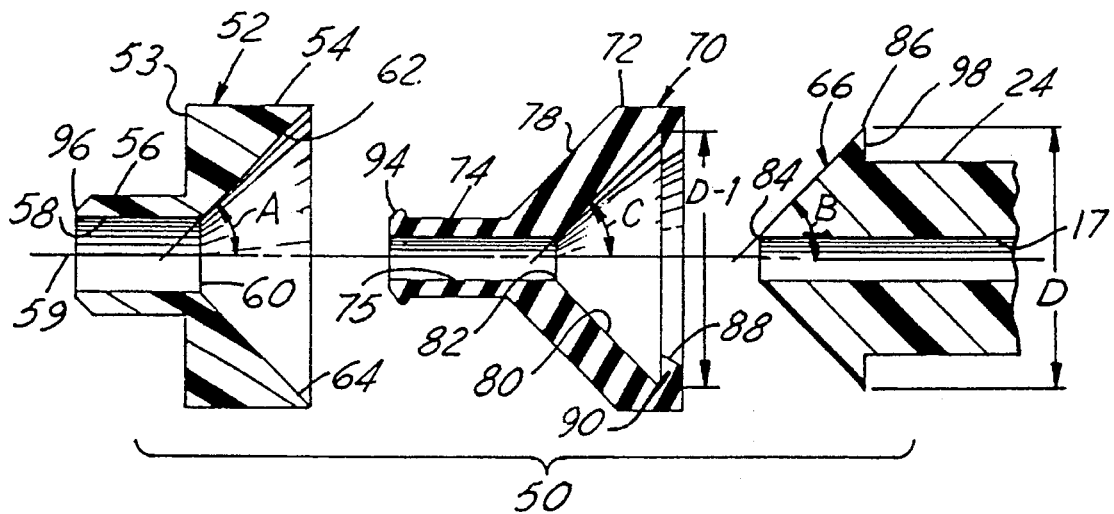
FIG. 6 is an enlarged exploded view of the isolator assembly illustrating a reactive housing, isolator, and sheath of the present invention.

As seen in FIG. 6, the isolator assembly 50 also includes a cable sheath head 66, formed with a truncated conical surface 67, and a rubber isolator 70. The housing 52, molded of hard plastic material, comprises an aft larger diameter annular portion 54 of a predetermined diameter and a forward smaller diameter tubular portion 56 of a predetermined diameter. An axial through-bore 58 of the tubular portion 56, which extends into the housing annular portion 54, is concentrically disposed about principal axis 59 and is formed with a predetermined diameter. An aft end 60 of the bore 58 terminates in an internal truncated conical surface 62 inclined at a predetermined acute angle "A" of the order of 45 degrees with the bore axis 59. The truncated conical surface 62 terminates at its aft end in a base opening 64.

FIG. 6 shows the sheath 14 (FIG. 4) having its enlarged diameter portion 24 terminating at its forward end in the integral truncated conical head portion 66 inclined at a predetermined acute angle "B" equal to angle "A". It will be noted that the sheath axial passageway 17 is of predetermined diameter adapted to receive the cable core 16 therethrough for reciprocal travel relative to the sheath 14 (FIG. 4).

With continued reference to FIG. 6, the isolator 70 includes a larger diameter aft end portion 72 and a smaller diameter forward barrel portion 74 interconnected by a body portion 76. The barrel portion 74 has a concentric core passageway 75 providing a continuation of the sheath passageway 17 as seen in the FIG. 4. The body portion 76 is formed with an outer truncated conical surface 78 and an inner concentric truncated conical surface 80, with both surfaces 78 and 80 inclined at a predetermined acute angle "C" with respect to axis 59. The inner conical surface 80 defines a truncated conical socket having a forward orifice 82 of a predetermined diameter less than the sheath passageway diameter 58.

In FIG. 6 the sheath enlarged head 66 has an external apex aperture 84, complementary to isolator internal apex orifice 82, and a base 86 of predetermined diameter "D". The diameter "D" is substantially equal to but slightly less than internal diameter "D–1" of the isolator socket inner surface 80.

FIG. 4 shows the sheath truncated conical head 66 snugly received in the isolator socket by virtue of the isolator body 76 (FIG. 6) being stretched-over the sheath head 66 in a snap-fitted manner. The isolator base circular aperture 88 is defined by radially inwardly extending peripheral flange portion 90. FIG. 6 shows the flange portion aperture 88 having a predetermined truncated conically inclined edge, matching the incline of the sheath truncated conical surface 67, facilitating the reception of the sheath head 66 into the isolator socket.

With reference to FIG. 6, the housing tubular portion 56 is of sufficient size to fit over the barrel portion 74 of the isolator. A raised resilient protrusion, in the form of a peripheral bead 94, is formed on the distal end of the barrel 74 juxtaposed free end 96 of the tubular portion 56 releasably retaining the isolator 70 in the housing 52. FIG. 6 shows a radially extending shoulder 98 of the sheath head 66, adapted to be engaged by the isolator radially inwardly extending flange 90 to releasably retain the sheath head 66 in the isolator socket.

With reference to FIG. 4, when a force is transmitted through the clutch cable assembly 13 (FIG. 3), its core 16 is under tension and its surrounding sheath 14 reacts by being placed under a compressive force. In the disclosed embodiment, with the clutch actuating cable core 16 forward end attached to the clutch fork 34 (FIG. 3) of the transaxle 10 (FIG. 3), the cable assembly is subjected to the transaxle energy in motion, especially oscillatory motion of the cable core 16. Such cable assembly oscillatory motion results in the cable core impacting the sheath passageway 17 creating a vibratory force which is not constant but varies over time. This vibratory force, if not attenuated within the cable assembly 13 (FIG. 3), will result in noise and vibration at the clutch pedal end within the passenger compartment.

For a compression loaded isolator, in general, the change in deflection becomes smaller with increasing load, that is the spring or oscillatory rate rises with increasing energy in motion induced loads. A higher spring rate results in decreased isolation. For a given cable assembly compression load, the total isolator deflection under compression is smaller than it would be if the isolator were placed in shear. For a shear loaded elastomeric isolator, the change in deflection becomes larger with increasing load achieving a falling spring rate, thereby creating an improved isolation condition which is, however, unsatisfactory with respect to excess deflection.

With a rubber isolator 70 (FIG. 6), however, of conical shape, as disclosed in the present invention, the compressive force along the length of the cable sheath 14 (FIG. 3) provides a component of force both perpendicular to the surface of the isolator as well as parallel to its surface. The isolator is placed in compression by the force component perpendicular to its conical surface 78 (FIG. 6) and into shear by the force component parallel to its conical surface. Such a condition provides a desirable balance between minimized isolator deflection and acceptable isolation. By a small adjustment of the conical angles, shown at "A", "B", and "C" in FIG. 6, a different ratio between shear and compression can be obtained to customize the isolator deflection and isolation balance.

An area of concern with a cable assembly isolation system is relative radial oscillatory movement of the cable core 16 (FIG. 4) with respect to the isolation system, which in the worst case provides an easy path for vibration to be transmitted, for example, to a vehicle passenger compartment. This problem is alleviated to a considerable extent by the conical shape of the isolator 70 (FIG. 6) wherein a radial isolator force component is developed from the isolator's compressive force which component resists radial movement of the cable core 16 (FIG. 4). This resisting force assures the maintenance of a proper clearance in the cable sheath passageway 17 between the core 16 and the sheath isolation system as seen in FIG. 4. Durability is also improved as the core 16 is prevented from "sawing" through the isolator passageway 75.

Although the invention has been described by reference to a specific embodiment, it should be understood that numerous changes may be made within the spirit and scope of the invention concepts described. Accordingly, it is intended that the invention not be limited to the described embodiment, but that it have the full scope defined by the language of the following claims.

What is claimed is:

1. An isolator arrangement for an actuating cable assembly comprising:

a sheath portion comprising a forward end and an axial passageway for receiving a cable;

a reactive housing concentrically disposed about a principal axis of the sheath comprising an aft larger diameter annular portion and a forward smaller diameter tubular portion having a through-bore of predetermined diameter, said bore terminating in an aft internal truncated conical surface inclined at a predetermined acute angle with said axis and having a base opening in an aft end of said annular portion;

the forward end of the sheath terminating in a truncated conical head portion inclined at said acute angle and having an apex orifice, defined by a forward terminus of the sheath passageway;

an elastomeric isolator comprising a larger diameter aft end portion and a forwardly extending smaller diameter barrel portion interconnected by an intermediate body portion, said body portion formed with an outer truncated conical surface and an inner truncated conical socket both inclined at said acute angle, said barrel portion having a through bore concentrically disposed about the axis and terminating at an aft end in an apex orifice of said socket, said socket defining an aft orifice;

said isolator socket of sufficient size to snugly fit over said truncated conical head portion of said forward end of said sheath in a conforming self-centered manner and said housing tubular portion bore of sufficient size to snugly receive said isolator barrel portion with said isolator external conical surface nested in said housing conical surface, and engaging means adapted for interconnecting said isolator with said housing and said sheath.

2. The isolator arrangement as set forth in claim 1 wherein said isolator aft orifice is defined by a radially inwardly extending peripheral flange portion and said sheath truncated conical end terminating at its aft end in a radially inwardly extending shoulder adapted for engagement by said flange portion, whereby said isolator is releasably retained on said sheath truncated conical head portion.

3. The isolator arrangement as set forth in claim 1 wherein said isolator barrel portion terminates at its forward end in a raised peripheral resilient protrusion, whereby upon said barrel portion being telescopically received in said housing tubular portion said protrusion juxtaposed said tubular portion forward end such that said isolator barrel portion is releasably retained in said housing.

4. The isolator arrangement as set forth in claim 1 wherein said isolator barrel portion through-bore is of a predetermined diameter equal to the diameter of said sheath cable passageway.

5. The isolator arrangement as set forth in claim 1 wherein said sheath is formed of hard elastomeric material.

\* \* \* \* \*